(12) United States Patent
Yanagisawa

(10) Patent No.: US 8,729,391 B2
(45) Date of Patent: May 20, 2014

(54) WIRE OR CABLE

(75) Inventor: Hideyoshi Yanagisawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 671 days.

(21) Appl. No.: 12/831,487

(22) Filed: Jul. 7, 2010

(65) Prior Publication Data

US 2011/0005803 A1 Jan. 13, 2011

(30) Foreign Application Priority Data

Jul. 8, 2009 (JP) ................................ 2009-161359

(51) Int. Cl.
*H01B 3/28* (2006.01)
*H01B 3/30* (2006.01)
*H01B 7/00* (2006.01)
*H01B 7/02* (2006.01)
*C08L 23/08* (2006.01)
*C08L 23/16* (2006.01)

(52) U.S. Cl.
USPC .............. 174/110 AR; 174/110 SR; 524/430; 524/543

(58) Field of Classification Search
USPC ...... 428/405; 523/212; 174/110 AR, 110 SR; 524/430, 543; 525/192, 198
See application file for complete search history.

(56) References Cited

U.S. PATENT DOCUMENTS

| | | | |
|---|---|---|---|
| 4,550,056 A | 10/1985 | Pickwell et al. | |
| 5,282,998 A | 2/1994 | Horn et al. | |
| 6,303,681 B1 | 10/2001 | Furukawa et al. | |
| 6,395,856 B1 | 5/2002 | Petty et al. | |
| 2003/0195322 A1 * | 10/2003 | Horikoshi et al. | ............... 528/10 |

FOREIGN PATENT DOCUMENTS

| | | | |
|---|---|---|---|
| EP | 0 518 057 A1 | | 12/1992 |
| JP | 5-194544 A | | 8/1993 |
| JP | 5-239359 A | | 9/1993 |
| JP | 2000-034368 | * | 2/2000 |
| JP | 2001-64452 A | | 3/2001 |
| JP | 2001-114945 A | | 4/2001 |
| JP | 2002-513427 A | | 5/2002 |
| JP | 2005-248068 A | | 9/2005 |
| WO | WO 99/54386 A1 | | 10/1999 |

OTHER PUBLICATIONS

Extended European Search Report issued Sep. 7, 2011, in European Patent Application No. 10168671.5.

* cited by examiner

*Primary Examiner* — James J Seidleck
*Assistant Examiner* — Deve E Valdez
(74) *Attorney, Agent, or Firm* — Birch, Stewart, Kolasch & Birch, LLP

(57) ABSTRACT

A wire or cable comprising a conductor or wire core and a coating layer on the exterior of the conductor or wire core which is formed from a rubber or plastic composition containing a rubber or plastic and an inorganic filler having high moisture resistance is provided. The inorganic filler is the one which has been surface treated with an alkoxy group-containing organopolysiloxane having an unsaturated aliphatic group-containing group and a monovalent hydrocarbon group of 3 to 10 carbon atoms containing no aliphatic unsaturated bond obtained by partially cohydrolytic condensation of an organic functional group-containing silane and/or its (partially) hydrolytic condensate, and an organic functional group-containing silane and/or its (partially) hydrolytic condensate.

11 Claims, No Drawings

WIRE OR CABLE

CROSS-REFERENCE TO RELATED APPLICATION

This non-provisional application claims priority under 35 U.S.C. §119(a) on Patent Application No. 2009-161359 filed in Japan on Jul. 8, 2009, the entire contents of which are hereby incorporated by reference.

TECHNICAL FIELD

This invention relates to a wire or cable formed with a coating layer of a rubber or plastic composition on the exterior of a conductor or cable core. More specifically, this invention relates to a wire or cable having an improved moisture resistance.

BACKGROUND ART

Various rubber materials and plastic materials have been used for the insulator coating of a wire or a cable. Exemplary rubber materials include natural rubber, chloroprene rubber, chlorosulfonated polyethylene rubber, styrene butadiene rubber, butadiene acrylonitrile copolymer, ethylene propylene diene rubber, butyl rubber, polyisoprene, silicone rubber, fluororubber, and fluorine-containing elastomeric copolymer (for example, vinylidene fluoride-hexafluoropropene bromide copolymer, vinylidene fluoride-hexafluoropropene bromide-tetrafluoroethylene copolymer, vinylidene fluoride-pentafluoropropene bromide copolymer, vinylidene fluoride-chlorotrifluoroethylene copolymer, tetrafluoroethylene-propylene copolymer, and tetrafluoroethylene-propylene-vinylidene fluoride copolymer), and exemplary plastic materials include polyethylene, polypropylene, polyvinyl chloride, and polyamide.

When an inorganic filler is blended with such rubber or plastic, the inorganic filler does not bond with the rubber or plastic due to the poor wetting of the boundary between the rubber or the plastic and the inorganic filler, and the mixture suffered form drastic loss of moisture resistance. In addition, when the inorganic filler was blended at a high content, the inorganic filler suffered from poor dispersion, and this resulted in the drastic loss of the mechanical properties.

Treatment of the inorganic filler surface with a silane coupling agent such as vinyltriethoxysilane or tris(methoxyethoxy)vinylsilane has been proposed as an attempt to improve the moisture resistance and the mechanical properties. Such surface treatment with the silane coupling agent, however, suffered from the drawback of insufficient moisture resistance and mechanical properties due to the insufficient surface treating effect due to the volatilization of the surface treating agent and insufficient hydrophobicity.

As an alkoxy group-containing silicone composition having vinyl groups and alkyl groups, JP-A 5-194544 discloses a straight and cyclic siloxane or siloxane oligomer mixture represented by the following formulae I and II:

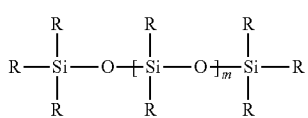

I

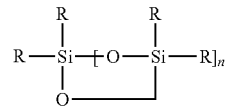

II wherein m is an integer of 0 to 8, n is an integer of 2 to 8, and R comprises vinyl group, methoxy group and/or ethoxy group, and/or an alkyl group, an isoalkyl group, or a cycloalkyl group of 1 to 18 carbon atoms, with the proviso that at least one vinyl group per silicon atom is present, the molar ratio of vinyl group to alkoxy group is 1:1 to 1:8, and the molar ratio of vinyl group to alkyl group is 1:0 to 1:8 for the crosslinking agent of the insulator material used for the cable. However, this publication does not disclose the use of such compound for the treatment of the inorganic filler in order to improve the moisture resistance. In addition, even if such compound were used for the treatment of the inorganic filler, improvement of the moisture resistance would be poor since this compound contains too much alkoxy groups in relation to vinyl group. Accordingly, further improvements have been awaited.

Other prior art documents include the following documents 2 to 6.

| Citation List | |
|---|---|
| Patent Document 1: | JP-A 5-194544 |
| Patent Document 2: | JP-A 5-239359 |
| Patent Document 3: | JP-A 2001-64452 |
| Patent Document 4: | JP-A 2001-114945 |
| Patent Document 5: | JP-A 2002-513427 |
| Patent Document 6: | JP-A 2005-248068 |

SUMMARY OF INVENTION

The present invention has been completed in view of the situation as described above, and an object of the present invention is to provide a wire or cable which has obviated the drawbacks as described above, and which is formed with a coating layer of a rubber or plastic composition containing an inorganic filler having an improved moisture resistance.

In order to realize such objects, the inventors of the present invention made an intensive study for the wire or cable having a coating layer of a rubber or plastic composition containing a rubber or plastic and an inorganic filler formed on the exterior of a conductor or cable core, and found that when the inorganic filler used has been surface treated with an alkoxy group-containing organopolysiloxane having an unsaturated aliphatic group-containing group and a monovalent hydrocarbon group of 3 to 10 carbon atoms containing no aliphatic unsaturated bond obtained by partially cohydrolytic condensation of an organic functional group-containing silane represented by the following general formula (1) and/or its (partially) hydrolytic condensate and an organic functional group-containing silane represented by the following general formula (2) and/or its (partially) hydrolytic condensate, the resulting wire or cable exhibits good dispersion of the inorganic filler even if the inorganic filler were blended at a high content, and exhibits high moisture resistance due to the wettability of the inorganic filler. The present invention has been completed on the bases of such findings.

Accordingly, this invention provides a wire or cable as described below.

[1] A wire or cable comprising a conductor or wire core and a coating layer on the exterior of the conductor or wire core which is formed from a rubber or plastic composition containing a rubber or plastic and an inorganic filler, wherein the inorganic filler is the one which has been surface treated with an alkoxy group-containing organopolysiloxane having an unsaturated aliphatic group-containing group and a monovalent hydrocarbon group of 3 to 10 carbon atoms containing no aliphatic unsaturated bond obtained by partially cohydrolytic condensation or alkoxylation (when X is a halogen atom) following the partially cohydrolytic condensation of an organic functional group-containing silane represented by the following general formula (1):

$$(R^1)(R^2)Si(X)_2 \quad (1)$$

wherein $R^2$ represents an unsaturated aliphatic group-containing group or a monovalent hydrocarbon group of 3 to 10 carbon atoms containing no aliphatic unsaturated bond, $R^2$ represents a monovalent hydrocarbon other than $R^1$, and X represents a halogen atom or an alkoxy group of 1 to 4 carbon atoms, and/or its (partially) hydrolytic condensate, and an organic functional group-containing silane represented by the following general formula (2):

$$(R^3)Si(X)_3 \quad (2)$$

wherein $R^3$ represents an unsaturated aliphatic group-containing group or a monovalent hydrocarbon group of 3 to 10 carbon atoms containing no aliphatic unsaturated bond, and X represents a halogen atom or an alkoxy group of 1 to 4 carbon atoms, and/or its (partially) hydrolytic condensate.

[2] The wire or cable according to [1] wherein the molar ratio of the unsaturated aliphatic group-containing group to the alkoxy group (the unsaturated group-containing group/the alkoxy group) in the alkoxy group-containing organopolysiloxane used for the surface treatment of the inorganic filler is at least 1, and the molar ratio of the unsaturated aliphatic group-containing group to the monovalent hydrocarbon group of 3 to 10 carbon atoms containing no aliphatic unsaturated bond (the unsaturated group-containing group/the monovalent hydrocarbon group) is at least 1.

[3] The wire or cable according to [1] or [2] wherein the rubber or the plastic is an ethylene-propylene-diene copolymer and/or an ethylene-vinyl acetate copolymer.

Advantageous Effects of Invention

In the present invention, the wire or cable produced has improved mechanical properties and high water resistance since the rubber or plastic and the inorganic filler are uniformly dispersed and firmly bonded.

DESCRIPTION OF EMBODIMENTS

The rubber or plastic used in the present invention are not particularly limited. Exemplary rubber materials include natural rubber, chloroprene rubber, chlorosulfonated polyethylene rubber, styrene butadiene rubber, butadiene acrylonitrile copolymer, ethylene-propylene-diene copolymer, butyl rubber, polyisoprene, silicone rubber, fluoro rubber, and fluorine-containing elastomeric copolymer (such as vinylidene fluoride-hexafluoropropene bromide copolymer, vinylidene fluoride-hexafluoropropene bromide-tetrafluoroethylene copolymer, vinylidene fluoride-pentafluoropropene bromide copolymer, vinylidene fluoride-chlorotrifluoroethylene copolymer, tetrafluoroethylene-propylene copolymer, and tetrafluoroethylene-propylene-vinylidene fluoride copolymer). Exemplary plastic materials include polyethylene, polypropylene, ethylene-α olefin copolymer, ethylene-vinyl acetate-vinyl chloride copolymer, ethylene-vinyl chloride copolymer, polyvinyl acetate, ethylene-vinyl acetate copolymer, ethylene-octene copolymer, polyvinyl chloride, chlorinated polyethylene, chlorinated polyethylene-acrylonitrile-styrene copolymer, polyether chloride, polyvinylidene chloride, acryl-modified polyvinyl chloride, vinylidene fluoride, polytetrafluoroethylene, perfluoroalkoxyfluororesin, tetrafluoroethylene-hexafluoropropylene copolymer, ethylene-tetrafluoroethylene copolymer, polychlorotrifluoroethylene, vinylidene fluoride-hexafluoropropene bromide copolymer, 1-dihydroperfluoropropene bromide copolymer, tetrafluoroethylene-perfluoroalkylvinyl ether copolymer, ethylene-chlorotrifluoroethylene copolymer, polyvinyl fluoride, polyurethane, polyamide, polyamideimide, polyamide elastomer, polycarbonate, modified polycarbonate, polyether sulfone, polyphenylene sulfide, polyphenylene sulfone, polyethylene terephthalate, polybuthylene terephthalate, polystyrene, poly sulfone, acrylate-styrene-acrylonitrile copolymer, acrylonitrile-butadiene-styrene copolymer, methacrylate-butylene-styrene copolymer, methacryl-styrene copolymer, styrene-acrylonitrile copolymer, oxybenzoyl polyester, phenol resin, polyacetal, methacrylic resin, epoxy resin, unsaturated polyester resin, silicone resin, and modification product of the resin as mentioned above, which may be used alone or in combination of two or more. Among these, the preferred are ethylene-propylene-diene copolymer and ethylene-vinyl acetate copolymer, and the most preferred is ethylene-propylene-diene copolymer in view of the good crosslinkability the electron beam irradiation and capability of production at low cost.

Examples of the inorganic filler used in the present invention include fillers such as clay, talc, calcium carbonate, and hydrotalcite; carbon black fillers such as channelblack, furnace black (such as SAF, HAF, FEF, SRF, GPE, and ECF), and thermal black (such as FT, MT, and acetylene black); and oxides, hydroxides, carbonates, sulfides, nitrates, chlorides of magnesium, aluminum and calcium. Among these, the preferred are talc, clay, and calcium carbonate in view of their high thermal stability with reduced loss of resistance to thermal aging when the filler is incorporated at a large amount.

The inorganic filler may preferably have an average particle size of up to 6 μm, more preferably 0.01 to 6 μm, and more preferably 0.1 to 3 μm. Excessively large average particle size of the inorganic filler may invite decrease of the breakdown voltage, while excessively small average particle size is likely to invite loss of heat resistance. In the present invention, the average particle size may be determined by laser beam diffractometry.

The inorganic filler is preferably incorporated at an amount of 5 to 200 parts by weight, and more preferably at 20 to 120 parts by weight in relation to 100 parts by weight of the rubber or the plastic. Improvement in the performance may be difficult by the incorporation at an amount of less than 5 parts by weight, whereas the incorporation at an amount in excess of 200 parts by weight may result in the loss of the mechanical properties.

In the present invention, incorporation of the inorganic filler surface treated with the particular alkoxy group-containing organopolysiloxane into the rubber or plastic facilitates uniform dispersion of the inorganic filler in the rubber or plastic, and loss of mechanical properties by the incorporation of the inorganic filler at a large amount is thereby prevented. More specifically, when untreated inorganic filler is incorporated in the rubber or plastic, aggregation of the inorganic filler is induced due to the poor affinity between the rubber or plastic and the inorganic filler, and also, loss of moisture resistance, and hence, loss of mechanical properties is induced by the intrusion of moisture in the boundary between the rubber or plastic and the inorganic filler due to the lack of the reaction between the rubber or plastic and the inorganic filler. However, the incorporation of the inorganic filler which has been treated with the particular alkoxy group-containing organopolysiloxane facilitates the covering of the inorganic filler with an organic group which has a high affinity for the organic material (the rubber or plastic), and as will be described below, the reaction with the rubber or plastic is enabled by the presence of vinyl group as the organic functional group, and the loss the mechanical properties is thereby reduced. Furthermore, the surface of the inorganic filler becomes hydrophobic by the monovalent hydrocarbon group not containing an unsaturated aliphatic bond in the organopolysiloxane, and the moisture resistance of the boundary between the rubber or plastic and the inorganic filler which is most susceptible to the moisture is improved, and this leads to the improvement in moisture resistance of the entire coating layer.

In the alkoxy group-containing organopolysiloxane used for treating the inorganic filler, the relation of the reactivity between the alkoxy group and the surface of the inorganic filler reacting with the alkoxy group; reactivity between the unsaturated aliphatic group and the rubber or the plastic reacting with the unsaturated aliphatic group; and the degree of hydrophobicization of the inorganic surface accomplished by the monovalent hydrocarbon group not containing the unsaturated aliphatic bond (in particular, the alkyl group) is important, and therefore, the composition should be designed so that the relation is such that the molar ratio of the unsaturated aliphatic group-containing group to the alkoxy group (the unsaturated group-containing group/the alkoxy group) is preferably at least 1, and more preferably from more than 1 to 1.5, and that the molar ratio of the unsaturated aliphatic group-containing group to the monovalent hydrocarbon group of 3 to 10 carbon atoms containing no unsaturated aliphatic bond (in particular, the alkyl group) (the unsaturated group-containing group/the monovalent hydrocarbon group) is at least 1, and more preferably from more than 1 to 4. When the ratio of the unsaturated group-containing group to the alkoxy group is less than 1, mechanical properties of the rubber or plastic may be insufficient due to insufficient reaction between the rubber or plastic and the inorganic filler or the insufficient dispersion of the inorganic filler. The ratio of the unsaturated group-containing group to the monovalent hydrocarbon group of less than 1 may also result in the poor mechanical properties of the rubber or plastic due to the insufficient reinforcement in spite of the good dispersion of the inorganic filler.

In the present invention, the alkoxy group-containing organopolysiloxane having an unsaturated aliphatic group-containing group and a monovalent hydrocarbon group of 3 to 10 carbon atoms containing no aliphatic unsaturated bond used for treating the inorganic filler is the one obtained by partially cohydrolytic condensation (and alkoxylation following partially cohydrolytic condensation when X is a halogen atom) of an organic functional group-containing silane represented by the following general formula (1):

$$(R^1)(R^2)Si(X)_2 \quad (1)$$

wherein $R^1$ represents an unsaturated aliphatic group-containing group or a monovalent hydrocarbon group of 3 to 10 carbon atoms containing no aliphatic unsaturated bond, $R^2$ represents a monovalent hydrocarbon other than $R^1$, and X represents a halogen atom or an alkoxy group of 1 to 4 carbon atoms, and/or its (partially) hydrolytic condensate, and an organic functional group-containing silane represented by the following general formula (2):

$$(R^3)Si(X)_3 \quad (2)$$

wherein $R^3$ represents an unsaturated aliphatic group-containing group or a monovalent hydrocarbon group of 3 to 10 carbon atoms containing no aliphatic unsaturated bond, and X represents a halogen atom or an alkoxy group of 1 to 4 carbon atoms, and/or its (partially) hydrolytic condensate. Excellent properties are realized by the treatment with this alkoxy group-containing organopolysiloxane.

In the organic functional group-containing silane represented by the following general formula (1):

$$(R^1)(R^2)Si(X)_2 \quad (1)$$

$R^1$ represents an unsaturated aliphatic group-containing group or a monovalent hydrocarbon group of 3 to 10 carbon atoms containing no unsaturated aliphatic bond; $R^2$ represents a monovalent hydrocarbon group of 1 to 3 carbon atoms; and X represents a halogen atom or an alkoxy group of 1 to 4 carbon atoms.

Examples of the unsaturated aliphatic group-containing group $R^1$ in the formula (1) include vinyl group, allyl group, butenyl group, pentenyl group, hexenyl group, decenyl group, vinyloxypropyl group, aryloxypropyl group, acryloxypropyl group, methacryloxypropyl group, acryloxymethyl group, and methacryloxymethyl group. Among these, the preferred are vinyl group, acryloxypropyl group, and methacryloxypropyl group in view of the availability of the starting material as well as ease of the synthesis.

Examples of the monovalent hydrocarbon group $R^2$ of 3 to 10 carbon atoms containing no unsaturated aliphatic bond include alkyl groups such as n-propyl group, i-propyl group, n-butyl group, i-butyl group, t-butyl group, n-pentyl group, n-hexyl group, n-octyl group, i-octyl group, and n-decyl group. Among these, the preferred are n-propyl group, n-butyl group, i-butyl group, n-hexyl group, n-octyl group, and n-decyl group, and the most preferred is n-propyl group in view of the availability of the starting material as well as ease of the synthesis.

Examples of the $R^2$, namely, the monovalent hydrocarbon group other than $R^1$ include methyl group and ethyl group, and the most preferred is methyl group.

Examples of the X include halogen atoms such as chlorine atom and bromine atom, and alkoxy groups of 1 to 4 carbon atoms such as methoxy group, ethoxy group, n-propoxy group, i-propoxy group, and butoxy group. The most preferred are methoxy group and ethoxy group.

Examples of the organic functional group-containing silane represented by the formula (1) include vinylmethyldimethoxysilane, vinylmethyldiethoxysilane, acryloxypropylmethyldimethoxysilane, methacryloxypropylmethyldimethoxysilane, methacryloxypropylmethyldiethoxysilane, vinylmethyldichlorosilane, n-propylmethyldimethoxysilane, n-butylmethyldimethoxysilane, i-butylmethyldimethoxysilane, n-hexylmethyldimethoxysilane, n-decylmethyldimethoxysilane, n-propylmethyldiethoxysilane, n-butylmethyldiethoxysilane, i-butylmethyldiethoxysilane, n-hexylmethyldiethoxysilane, n-decylmethyldiethoxysilane, and n-propylmethyldichlorosilane, which may be used alone or in combination of two or more.

In the organic functional group-containing silane represented by the following general formula (2):

$$(R^3)Si(X)_3 \quad (2)$$

$R^3$ is an unsaturated aliphatic group-containing group or a monovalent hydrocarbon group of 3 to 10 carbon atoms containing no unsaturated aliphatic bond, and X a halogen atom or an alkoxy group of 1 to 4 carbon atoms.

Examples of the unsaturated aliphatic group-containing group $R^3$ in the formula (2) include vinyl group, allyl group, butenyl group, pentenyl group, hexenyl group, decenyl group, vinyloxypropyl group, aryloxypropyl group, acryloxypropyl group, methacryloxypropyl group, acryloxymethyl group, and methacryloxymethyl group. Among these, the preferred are vinyl group, acryloxypropyl group, and methacryloxypropyl group in view of the availability of the starting material as well as ease of the synthesis.

Examples of the monovalent hydrocarbon group $R^3$ of 3 to 10 carbon atoms containing no unsaturated aliphatic bond include alkyl groups such as n-propyl group, i-propyl group, n-butyl group, i-butyl group, t-butyl group, n-pentyl group, n-hexyl group, n-octyl group, i-octyl group, and n-decyl group. Among these, the preferred are n-propyl group, n-butyl group, i-butyl group, n-hexyl group, n-octyl group, and n-decyl group, and the most preferred are n-propyl group in view of the availability of the starting material as well as ease of the synthesis.

Examples of the X include halogen atoms such as chlorine atom and bromine atom, and alkoxy groups having 1 to 4 carbon atoms such as methoxy group, ethoxy group, n-propoxy group, i-propoxy group, and butoxy group. The most preferred are methoxy group and ethoxy group.

Examples of the organic functional group-containing silane represented by the formula (2) include, vinyltrimethoxysilane, vinyltriethoxysilane, acryloxypropyltrimethoxysilane, methacryloxypropyltrimethoxysilane, methacryloxypropyltriethoxysilane, vinyltrichlorosilane, n-propyltrimethoxysilane, n-butyltrimethoxysilane, i-butyltrimethoxysilane, n-hexyltrimethoxysilane, n-decyltrimethoxysilane, n-propyltriethoxysilane, n-butyltriethoxysilane, i-butyltriethoxysilane, n-hexyltriethoxysilane, n-decyltriethoxysilane, and n-propyltrichlorosilane which may be used alone or in combination of two or more.

The alkoxy group-containing organopolysiloxane used in the present invention is prepared by using the organic functional group-containing silane represented by the formula (1) and/or its (partially) hydrolytic condensate and the organic functional group-containing silane represented by the formula (2) and/or its (partially) hydrolytic condensate as critical starting materials, and conducting partially cohydrolytic condensation, and further alkoxylation following partially cohydrolytic condensation when X is a halogen atom. In this case, $R^1$ and $R^3$ are selected so that the resulting alkoxy group-containing organopolysiloxane has an unsaturated aliphatic group-containing group and a monovalent hydrocarbon group of 3 to 10 carbon atoms containing no aliphatic unsaturated bond.

The ratio of the organic functional group-containing silane represented by the formula (1) and/or its (partially) hydrolytic condensate and the organic functional group-containing silane represented by the formula (2) and/or its (partially) hydrolytic condensate used is not particularly limited as long as the resulting alkoxy group-containing organopolysiloxane has the unsaturated aliphatic group-containing group and the monovalent hydrocarbon group of 3 to 10 carbon atoms containing no unsaturated aliphatic bond. However, at least 1 mole, and in particular, 1.1 to 3 moles of the organic functional group-containing silane represented by the formula (1) and/or its (partially) hydrolytic condensate is preferably present per mole of the organic functional group-containing silane represented by the formula (2) and/or its (partially) hydrolytic condensate. Furthermore, the molar ratio of the unsaturated aliphatic group-containing group to the alkoxy group in the alkoxy group-containing organopolysiloxane (the unsaturated group-containing group/the alkoxy group) is preferably at least 1; and the molar ratio of the unsaturated aliphatic group-containing group to the monovalent hydrocarbon group of 3 to 10 carbon atoms containing no unsaturated aliphatic bond (the unsaturated group-containing group/ the monovalent hydrocarbon group) is preferably at least 1.

The method used for the hydrolysis and condensation is not particularly limited, and the hydrolysis and condensation may be accomplished by a method known in the art, for example, by adding water to the organic functional group-containing silane represented by the formula (1) and the organic functional group-containing silane represented by the formula (2) or their (partially) hydrolytic condensates in the presence of a hydrolytic condensation catalyst to promote the partial hydrolysis and polycondensation. If desired, this process may be conducted by using an adequate organic solvent.

The hydrolytic condensation catalyst used may be the one known in the art, and examples include organic acids such as acetic acid, trifluoroacetic acid, butyric acid, oxalic acid, maleic acid, citric acid, methanesulfonic acid, p-toluenesulfonic acid, and trifluoromethanesulfonic acid; inorganic acids such as hydrochloric acid, nitric acid, phosphoric acid, and sulfuric acid; basic compounds such as sodium hydroxide, potassium hydroxide, sodium hydrogencarbonate, sodium carbonate, sodium acetate, potassium acetate, ammonia, ammonium hydroxide, and triethylamine; fluorine-containing compounds such as potassium fluoride and ammonium fluoride; and organometallic compounds such as tetraisopropyl titanate, tetrabutyl titanate, dioctyl tin laurate, and aluminum chelate, which may be used alone or in combination of two or more. The amount of the catalyst used is preferably in the range of 0.0001 to 10% by mole and more preferably 0.001 to 3% by mole in relation to the molar amount of the Si atom.

In the cohydrolytic condensation, a material other than the organic functional group-containing silane represented by the formula (1), the organic functional group-containing silane represented by the formula (2), and their (partially) hydrolytic condensate may be additionally used at an amount not adversely affecting the performance of the resulting composition. Exemplary such materials include tetramethoxysilane, tetraethoxysilane, dimethyldimethoxysilane, dimethyldiethoxysilane, trimethylmethoxysilane, trimethylethoxysilane, phenyltrimethoxysilane, phenyltriethoxysilane, diphenyldimethoxysilane, diphenyldiethoxysilane, phenylmethyldimethoxysilane, phenylmethyldiethoxysilane, 3-glycidoxypropyltrimethoxysilane, 3-glycidoxypropyltriethoxysilane, 3,4-epoxycyclohexylethyltrimethoxysilane, 3,4-epoxy cyclohexylethyltriethoxysilane, 3-mercaptopropyltrimethoxysilane, 3-mercaptopropyltriethoxysilane, 3-aminopropyltriethoxysilane, 3-aminopropyltrimethoxysilane, 2-aminoethyl-3-aminopropyltrimethoxysilane, and 2-aminoethyl-3-aminopropyltriethoxysilane.

Such additional material may be used typically at an amount of up to 50% by mole, and preferably at up to 20% by mole in relation to 100% by mole in total of the organic functional group-containing silane represented by the formula (1), the organic functional group-containing silane represented by the formula (2), and their (partially) hydrolytic condensates. In this case, the amount of the (partially) hydrolytic condensate is calculated in terms of the silane, and for example, a pentamer is calculated as 5 moles of silane.

As described above, alkoxylation is required when X in the organic functional group-containing silane is a halogen atom.

The alkoxylation may be conducted by a method known in the art, and the organopolysiloxane that has been subjected to partially cohydrolytic condensation may be dehalogenated, for example, by adding an alcohol such as methanol or ethanol. In this process, an amine such as triethylamine, dimethyl benzylamine, or tetramethylethylenediamine, urea, or the like may be used as a dehalogenating agent. The alkoxylation may also be conducted through desaltation by adding sodium methylate or sodium ethylate.

The alkoxylation may be conducted simultaneously with the cohydrolytic condensation.

The alkoxy group-containing organopolysiloxane used in the present invention may be the one polymerized to any degree of polymerization. However, the alkoxy group-containing organopolysiloxane is preferably a polymer containing about 5 to about 100 silicon atoms, more preferably a silicone oligomer containing about 5 to about 30 silicon atoms, and more preferably a silicone oligomer containing about 5 to about 20 silicon atoms in view of the reactivity with the inorganic material and ease of the treatment. An excessively high degree of polymerization may result in the loss of workability or efficiency of the treatment.

With regard to the degree of polymerization, the average degree of polymerization is determined by the amount of water used for the cohydrolysis and polycondensation. The water added for the hydrolysis should be strictly determined for its amount since excessive water addition results the corresponding amount of halogen atoms and alkoxy groups hydrolyzed, and the resulting resin will be the one having increased branch structures and the production of the desired alkoxy group-containing organopolysiloxane is thus hindered. For example, when all the silane materials used are monomers having only one silicon atom, cohydrolysis and polycondensation may be accomplished by using (Z-1) moles of water per z moles of the silane material to produce an organopolysiloxane having an average degree of polymerization of Z.

In this process, an organic solvent such as an alcohol, an ether, an ester, or a ketone may be used as desired. Examples of such organic solvents include alcohols such as methanol, ethanol, n-propyl alcohol, isopropyl alcohol, and propylene glycol monomethyl ether, ethers such as diethylether and dipropyl ether, esters such as methyl acetate, ethyl acetate, and ethyl acetate, and ketones such as acetone, methyl ethyl ketone, and methyl isobutyl ketone. A nonpolar solvent such as hexane, toluene, or xylene may also be used with such organic solvent. The most preferred is the use of an alcohol such as methanol, ethanol, and isopropyl alcohol.

The organic solvent is preferably used at an amount in the range of 0 to 1,000 parts by weight in relation to 100 parts by weight in total of the starting materials, namely, the silanes and/or their (partially) hydrolytic condensates. Insufficient use may invite inconsistency of the reaction system at the start of the hydrolysis. On the other hand, excessive use may be economically disadvantageous since no further improvement is attained by such excessive use while such excessive use results in the decrease of the pot yield. Accordingly, the solvent is preferably used in an amount of 10 to 500 parts by weight, more preferably 15 to 200 parts by weight.

In a preferred embodiment of the partially cohydrolytic condensation reaction, a predetermined amount of water or water/organic solvent mixture is added dropwise to the mixture system of the silane starting materials, the catalyst, and the organic solvent; or alternatively, a predetermined amount of water/catalyst mixture or water/catalyst/organic solvent mixture may be added dropwise to the mixture system of the silane starting materials and the organic solvent at a temperature in the range of 0 to 150° C. A temperature lower than room temperature is generally unpractical due to the low speed of the reaction while an excessively high temperature may invite polymerization of the unsaturated group which results in the crosslinking, increase in the viscosity or gelation, or adverse effects on the organic functional group. Accordingly, the preferred temperature is in the range of 20 to 130° C. After the reaction, purification steps such as removal of the catalyst by neutralization, adsorption, filtration, or the like and removal by distillation of the organic solvent and the byproducts such as alcohols and low-boiling components are conducted to thereby obtain the alkoxy group-containing organopolysiloxane to be used in the present invention.

The resulting alkoxy group-containing organopolysiloxane having the unsaturated aliphatic group-containing group and the monovalent hydrocarbon group of 3 to 10 carbon atoms containing no unsaturated aliphatic bond has low volatility due to the low content of the highly volatile unsaturated group-containing alkoxysilane compound. Therefore, the loss by the volatilization during the treatment of the inorganic filler is reduced. In addition, the presence of the hydrolysable alkoxy group in the molecule facilitates its hydrolysis by the water in the inorganic filler and the moisture in the air, and strong bond with the inorganic filler is thereby realized. Furthermore, the unsaturated group in the molecule reacts with the rubber or plastic when the inorganic filler is mixed and kneaded with the rubber or plastic and crosslinked by the electron beam, and as a consequence, a firm bond is established between the rubber or plastic and the inorganic filler.

The method used for the surface treatment of the inorganic filler by the organopolysiloxane of the present invention is not particularly limited, and exemplary methods used include use of a slurry in the case of wet blending and use of a henschel mixer in the case of dry blending.

The amount of the organopolysiloxane used for the surface treatment is preferably in the range of 0.1 to 10% by weight, and more preferably 0.5 to 5% by weight in relation to 100 parts by weight of the inorganic filler.

If desired, the composition of the present invention may contain an adequate amount of a crosslinking agent, a crosslinking aid, an antioxidant, a lubricating agent, a working aid, a stabilizer, a pigment, a surface treating agent, or the like in addition to the inorganic filler. When a crosslinking agent or a crosslinking aid is incorporated, crosslinking can be accomplished, for example, by thermal crosslinking or crosslinking by ionizing radiation. It should be also noted that the crosslinking is not always necessary.

The wire or the cable of the present invention is the one having a coating layer of the rubber or plastic composition on the exterior of the conductor or the wire core. The coating layer may be formed by any method known in the art, and for example, the coating may be formed by using an extrusion coater.

Thickness of the coating layer may be adequately selected depending on the shape and size of the wire or the cable. The coating layer is typically formed to a thickness of about 0.1 to 10 mm.

EXAMPLES

Next, the present invention is described in further detail by referring to Synthetic Examples, Examples, and Comparative Examples, which merely illustrates some embodiments of the invention, and which by no means limit the scope of the invention unless their scope extends beyond that defined by the claims.

Synthetic Example 1

A 1 liter flask equipped with a stirrer, a cooling condenser, a thermometer, and a dropping funnel was charged with 160 g (1.0 mol) of vinylmethyldiethoxysilane, 103 g (0.5 mol) of propyltriethoxysilane, and 92 g (2.0 mol) of ethanol, and the mixture was stirred in the flask at an internal temperature of 20 to 30° C. while a mixture of 24 g (1.33 mol) of 0.05N aqueous solution and 46 g (1.0 mol) of 0.05N aqueous solution of hydrochrolic acid was added dropwise for 30 minutes. The temperature was increased, and the mixture was aged under reflux for 2 hours.

Next, 11.2 g of 1% by weight solution in ethanol of potassium fluoride (KF: $1.92 \times 10^{-3}$ mol) was added, and the mixture was aged under reflux for 2 hours for partially cohydrolytic polycondensation. Next, the mixture was heated under reduced pressure to an internal temperature of 100° C. to remove the alcohol components by distillation. The mixture was then filtered to obtain the organopolysiloxane which was a colorless transparent liquid (yield: 156 g, 95.2%).

The weight average molecular weight measured by gel permeation chromatography (GPC) was 900.

In proton NMR spectroscopy ($^1$H-NMR), the molar ratio of the vinyl group to the ethoxy group (vinyl group/ethoxy group) was 6.0/5.0, and the molar ratio of the vinyl group to the propyl group (vinyl group/propyl group) was 6.0/3.0.

Synthetic Examples 2 to 6

The procedure of Synthetic Example 1 was repeated by changing the type of the silanes used and the amount of the water used to obtain the organopolysiloxanes shown in Table 1.

Example 1

100 parts by weight of ethylene-propylene-diene copolymer (EP-1 manufactured by Japan Synthetic Rubber Co., Ltd.), 2 parts by weight of dicumyl peroxide (crosslinking agent), 0.2 parts by weight of Irganox 1010 (product name of Ciba-Geigy Ltd.) (antioxidant), 1 part by weight of stearic acid (lubricating agent), and 60 parts by weight of Mistron Vapor talc A having an average particle size of 0.8 μm surface treated with 1% by weight of the organopolysiloxane of the Synthetic Example 1 (inorganic filler) were weighed, and these components were introduced in a small sized mixer with the volume of 60 ml. The mixture was kneaded at 120° C. to produce a compound.

The compound was crosslinked at 100 atm for 10 minutes in a press maintained at 180° C. to produce a crosslinked sheet having a thickness of 1 mm (10 cm×10 cm).

Examples 2 to 6

The procedure of Example 1 was repeated except that 60 parts by weight of the Mistron Vapor talc A having an average particle size of 0.8 μm which had been surface treated with 1% by weight of the organopolysiloxane of the Synthetic Examples 2 to 6 of Table 1 was used for the inorganic filler to produce a crosslinked sheet.

Comparative Example 1

The procedure of Example 1 was repeated except that 60 parts by weight of untreated Mistron Vapor talc A having an average particle size of 0.8 μm was used for the inorganic filler to produce a crosslinked sheet.

TABLE 1

|  |  | Material A (content, mol) | Material B (content, mol) | Material C (content, mol) | Water content (mol) | Average molecular weight of the resulting siloxane | Unsaturated group/ Alkoxy group | Unsaturated group/$C_{3\text{-}10}$ Alkyl group |
|---|---|---|---|---|---|---|---|---|
| Synthetic Example | 2 | Propylmethyl-dimethoxy-silane (0.3) | Vinyl-trimethoxy-silane (0.3) | Vinylmethyl-dimethoxy-silane (0.3) | 0.8 | 850 | 1.20 | 2.00 |
|  | 3 | Vinylmethyl-diethoxy-silane (0.6) | Propyl-triethoxy-silane (0.3) | Vinyl-triethoxy-silane (0.1) | 0.9 | 1010 | 1.17 | 2.33 |
|  | 4 | Vinylmethyl-diethoxy-silane (0.5) | Hexyl-triethoxy-silane (0.2) | — | 0.6 | 750 | 1.25 | 2.50 |
|  | 5 | Vinylmethyl-diethoxy-silane (0.9) | Decyl-triethoxy-silane (0.6) | — | 1.4 | 2070 | 1.13 | 1.50 |
|  | 6 | 3-methacryl-oxypropyl-methyl-dimethoxy-silane (0.6) | Propyl-trimethoxy-silane (0.3) | — | 0.8 | 1350 | 1.20 | 2.00 |
| Comparative Synthetic Example | 1 | Propyl-triethoxy-silane (0.3) | Vinyl-triethoxy-silane (0.3) | — | 0.5 | 720 | 0.50 | 1.00 |
|  | 2 | Propyl-triethoxy-silane (0.6) | Vinyl-triethoxy-silane (0.3) | — | 0.8 | 1120 | 0.27 | 0.50 |

Comparative Example 2

The procedure of Example 1 was repeated except that 60 parts by weight of the Mistron Vapor talc A having an average particle size of 0.8 μm which had been surface treated with 1% by weight of vinyltriethoxysilane was used for the inorganic filler to produce a crosslinked sheet.

Comparative Examples 3 and 4

The procedure of Example 1 was repeated except that 60 parts by weight of the Mistron Vapor talc A having an average particle size of 0.8 μm which had been surface treated with 1% by weight of the organopolysiloxane of the Comparative Synthetic Examples 1 and 2 of Table 1 was used for the inorganic filler to produce a crosslinked sheet.

Example 7

The procedure of Example 1 was repeated except that the ethylene-propylene-diene copolymer was replaced with ethylene-vinyl acetate copolymer (X-501 manufactured by Mitsubishi Chemical Corporation) to produce a crosslinked sheet.

Examples 8 to 12

The procedure of Example 7 was repeated except that 60 parts by weight of the Mistron Vapor talc A having an average particle size of 0.8 μm which had been surface treated with 1% by weight of the organopolysiloxane of the Synthetic Examples 2 to 6 of Table 1 was used for the inorganic filler to produce a crosslinked sheet.

Comparative Example 5

The procedure of Example 7 was repeated except that 60 parts by weight of untreated Mistron Vapor talc A having an average particle size of 0.8 μm was used for the inorganic filler to produce a crosslinked sheet.

Comparative Example 6

The procedure of Example 7 was repeated except that 60 parts by weight of the Mistron Vapor talc A having an average particle size of 0.8 μm which had been surface treated with 1% by weight of vinyltriethoxysilane was used for the inorganic filler to produce a crosslinked sheet.

Comparative Examples 7 and 8

The procedure of Example 8 was repeated except that 60 parts by weight of the Mistron Vapor talc A having an average particle size of 0.8 μm which had been surface treated with 1% by weight of the organopolysiloxane of the Comparative Synthetic Examples 1 and 2 of Table 1 was used for the inorganic filler to produce a crosslinked sheet.

Tables 2 and 3 show the results of the evaluation of the crosslinked sheets of Examples 1 to 12 and Comparative Examples 1 to 8 for the dispersion of the inorganic filler and the moisture resistance.

The dispersion of the inorganic filler was evaluated by slicing the crosslinked sheet to a very thin section with a microtome and observing the cross-section by a scanning electron microscope. The samples with the inorganic filler aggregates of less than 5 μm, 5 to 10 μm, and more than 10 μm were respectively evaluated "○", "Δ", and "x".

The moisture resistance was evaluated by immersing the crosslinked sheet in the warm water of 50° C. for 60 days and determining the amount of the absorbed water (% by weight). This value is shown in the Tables.

TABLE 2

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Dispersibility of the filler | ○ | ○ | ○ | ○ | ○ | ○ | X | Δ | X | Δ |
| Moisture absorption (% by weight) | 2.6 | 2.7 | 2.8 | 2.5 | 2.6 | 2.6 | 12.6 | 5.7 | 3.7 | 4.3 |

TABLE 3

| | Example | | | | | | Comparative Example | | | |
|---|---|---|---|---|---|---|---|---|---|---|
| | 7 | 8 | 9 | 10 | 11 | 12 | 5 | 6 | 7 | 8 |
| Dispersibility of the filler | ○ | ○ | ○ | ○ | ○ | ○ | X | Δ | X | Δ |
| Moisture absorption (% by weight) | 3 | 3.2 | 3.2 | 2.9 | 2.8 | 2.9 | 13.3 | 6.4 | 3.9 | 4.4 |

Japanese Patent Application No. 2009-161359 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A wire or cable comprising a conductor or wire core and a coating layer on the exterior of the conductor or wire core which is formed from a rubber or plastic composition containing a rubber or plastic and an inorganic filler, wherein the inorganic filler is the one which has been surface treated with an alkoxy group-containing organopolysiloxane having an unsaturated aliphatic group-containing group and a monovalent hydrocarbon group of 3 to 10 carbon atoms containing no aliphatic unsaturated bond obtained by partially cohydrolytic condensation or alkoxylation (when X is a halogen atom) following the partially cohydrolytic condensation of an organic functional group-containing silane represented by the following general formula (1):

$$(R^1)(R^2)Si(X)_2 \quad (1)$$

wherein $R^1$ represents an unsaturated aliphatic group-containing group or a monovalent hydrocarbon group of 3 to 10 carbon atoms containing no aliphatic unsaturated bond, $R^2$ represents a monovalent hydrocarbon other than $R^1$, and X represents a halogen atom or an alkoxy group of 1 to 4 carbon atoms, and/or its (partially) hydrolytic condensate, and an organic functional group-containing silane represented by the following general formula (2):

$$(R^3)Si(X)_3 \quad (2)$$

wherein $R^3$ represents an unsaturated aliphatic group-containing group or a monovalent hydrocarbon group of 3 to 10 carbon atoms containing no aliphatic unsaturated bond, and X represents a halogen atom or an alkoxy group of 1 to 4 carbon atoms, and/or its (partially) hydrolytic condensate, wherein
the molar ratio (unsaturated group-containing group: alkoxy group) of the unsaturated aliphatic group-containing group to the alkoxy group in the alkoxy group-containing organopolysiloxane used for the surface treatment of the inorganic filler is at least 1, and
the molar ratio (unsaturated group-containing group: monovalent hydrocarbon group) of the unsaturated aliphatic group-containing group to the monovalent hydrocarbon group of 3 to 10 carbon atoms containing no aliphatic unsaturated bond is at least 1.

2. The wire or cable according to claim 1, wherein the rubber or the plastic is an ethylene-propylene-diene copolymer and/or an ethylene-vinyl acetate copolymer.

3. The wire or cable according to claim 1, wherein the inorganic filler is incorporated at an amount of 5 to 200 parts by weight in relation to 100 parts by weight of the rubber or the plastic.

4. The wire or cable according to claim 1 wherein the inorganic filler is incorporated at an amount of 20 to 120 parts by weight in relation to 100 parts by weight of the rubber or the plastic.

5. The wire or cable according to claim 1, wherein the inorganic filler is talc, clay or calcium carbonate.

6. The wire or cable according to claim 1, wherein
the silane of formula (1) is at least one member selected from the group consisting of vinylmethyldimethoxysilane, vinylmethyldiethoxysilane, acryloxypropylmethyldimethoxysilane, methacryloxypropylmethyldimethoxysilane, methacryloxypropylmethyldiethoxysilane, vinylmethyldichlorosilane, n-propylmethyldimethoxysilane, n-butylmethyldimethoxysilane, i-butylmethyldimethoxysilane, n-hexylmethyldimethoxysilane, n-decylmethyldimethoxysilane, n-propylmethyldiethoxysilane, n-butylmethyldiethoxysilane, i-butylmethyldiethoxysilane, n-hexylmethyldiethoxysilane, n-decylmethyldiethoxysilane, and n-propylmethyldichlorosilane, and
the silane of formula (2) is at least one member selected from the group consisting of vinyltrimethoxysilane, vinyltriethoxysilane, acryloxypropyltrimethoxysilane, methacryloxypropyltrimethoxysilane, methacryloxypropyltriethoxysilane, vinyltrichlorosilane, n-propyltrimethoxysilane, n-butyltrimethoxysilane, i-butyltrimethoxysilane, n-hexyltrimethoxysilane, n-decyltrimethoxysilane, n-propyltriethoxysilane, n-butyltriethoxysilane, i-butyltriethoxysilane, n-hexyltriethoxysilane, n-decyltriethoxysilane, and n-propyltrichlorosilane.

7. The wire or cable according to claim 1, wherein the alkoxy group-containing organopolysiloxane has about 5 to about 100 silicon atoms.

8. The wire or cable according to claim 1, wherein the alkoxy group-containing organopolysiloxane has about 5 to about 30 silicon atoms.

9. The wire or cable according to claim 1, wherein the amount of the alkoxy group-containing organopolysiloxane used for the surface treatment is in the range of 0.1 to 10% by weight in relation to 100 parts by weight of the inorganic filler.

10. The wire or cable according to claim 1, wherein the amount of the alkoxy group-containing organopolysiloxane used for the surface treatment is in the range of 0.5 to 5% by weight in relation to 100 parts by weight of the inorganic filler.

11. A wire or cable comprising a conductor or wire core and a coating layer on the exterior of the conductor or wire core which is formed from a rubber or plastic composition containing 100 parts by weight of a rubber or plastic selected from the group consisting of an ethylene-propylene-diene copolymer and ethylene-vinyl acetate copolymer and 5 to 200 parts by weight of an inorganic filler selected from the group consisting of talc, clay and calcium carbonate,
wherein the inorganic filler is the one which has been surface treated with an alkoxy group-containing organopolysiloxane
having about 5 to about 100 silicon atoms and
having an unsaturated aliphatic group-containing group and a monovalent hydrocarbon group of 3 to 10 carbon atoms containing no aliphatic unsaturated bond obtained by partially cohydrolytic condensation or alkoxylation (when X is a halogen atom) following the partially cohydrolytic condensation of an organic functional group-containing silane represented by the following general formula (1):

$$(R^1)(R^2)Si(X)_2 \quad (1)$$

wherein $R^1$ represents an unsaturated aliphatic group-containing group or a monovalent hydrocarbon group of 3 to 10 carbon atoms containing no aliphatic unsaturated bond, $R^2$ represents a monovalent hydrocarbon other than $R^1$, and X represents a halogen atom or an alkoxy group of 1 to 4 carbon atoms, and/or its (partially) hydrolytic condensate, and an organic functional group-containing silane represented by the following general formula (2):

$$(R^3)Si(X)_3 \quad (2)$$

wherein $R^3$ represents an unsaturated aliphatic group-containing group or a monovalent hydrocarbon group of 3 to 10 carbon atoms containing no aliphatic unsaturated bond, and X represents a halogen atom or an alkoxy group of 1 to 4 carbon atoms, and/or its (partially) hydrolytic condensate,
wherein
the molar ratio (unsaturated group-containing group: alkoxy group) of the unsaturated aliphatic group-containing group to the alkoxy group in the alkoxy group-containing organopolysiloxane used for the surface treatment of the inorganic filler is at least 1, and
the molar ratio (unsaturated group-containing group: monovalent hydrocarbon group) of the unsaturated aliphatic group-containing group to the monovalent hydrocarbon group of 3 to 10 carbon atoms containing no aliphatic unsaturated bond is at least 1.

* * * * *